United States Patent [19]

Latimer et al.

[11] 4,024,758
[45] May 24, 1977

[54] SIMULATED TESTING OF UNDERSEA APPARATUS

[75] Inventors: John P. Latimer; Royal M. Hagerty, both of Newport News; George A. Zahn, Gloucester, all of Va.

[73] Assignee: Deepsea Ventures, Inc., Gloucester Point, Va.

[22] Filed: June 29, 1976

[21] Appl. No.: 700,764

[52] U.S. Cl. .............................................. 73/170 A
[51] Int. Cl.² ......................................... G01N 1/00
[58] Field of Search ...................... 73/170 A, 425.2

[56] References Cited

UNITED STATES PATENTS

| 2,872,638 | 2/1959 | Jones | 73/170 A |
| 3,069,905 | 12/1962 | Erdely | 73/170 A |
| 3,106,437 | 10/1963 | Michalski | 73/170 A |

*Primary Examiner*—Jerry W. Myracle
*Attorney, Agent, or Firm*—Barry G. Magidoff

[57] ABSTRACT

This invention provides a means and method for testing of devices intended to operate in, or immediately beneath, the consolidated soil surface of the ocean floor. The mechanical and rheological properties of the consolidated soil surface are simulated by an electroconsolidation procedure which permits rapidly carrying out a series of tests on a surface which closely simulates the actual ocean floor surface.

17 Claims, 4 Drawing Figures

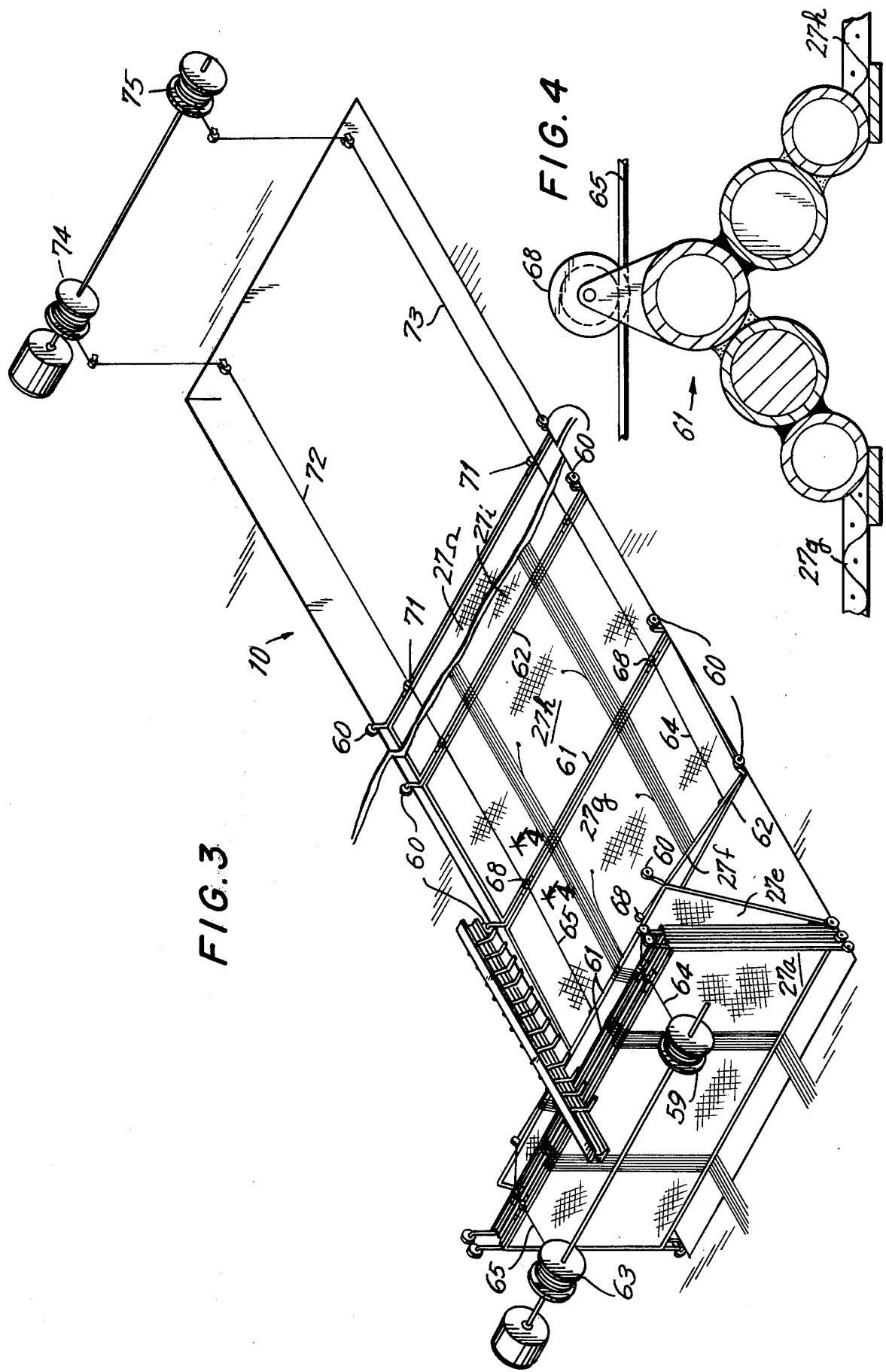

SIMULATED TESTING OF UNDERSEA APPARATUS

This invention provides a method and means for carrying out tests on operating means designed for use on, or beneath, the floors of deep bodies of water, for example, the ocean floor.

A great deal of interest has been generated in the past 20 years in exploring and operating upon the sea bed. Such activities include the boring into, and testing, of the ocean floor for scientific, e.g., geologic purposes, for oil drilling, and perhaps most promisingly, for the mining of ocean floor nodule ores, rich in manganese and other valuable metals.

The nature of this deep-water environment, being so hostile to human life and to most equipment which has been developed for both industrial and scientific use under more normal operating conditions, renders such operations hazardous and difficult. Further, because of the inaccessibility of the sea bed (work is often done at depths greater than 10,000 or 12,000 feet below sea level), there is a corresponding difficulty in determining, by on site testing, the effectiveness of any equipment operating at such depths. Not only is it difficult to determine whether the equipment can sustain itself at these great depths, but also the efficiency of the equipment in carrying out its intended chore, cannot readily be determined. Thus, much equipment that is being used is of unknown efficiency and durability.

The difficulty and expense of such on-site testing, however, has been accepted as one of the burdens which must be met when designing and developing equipment intended for use on the sea bed. Although it does tend to slow down the development of such equipment, on-site tests were believed to be necessary because of the seeming difficulty of simulating the, e.g., sea floor. Such on-site testing, for example, on the abyssal depths of the ocean floor, was expensive and time-consuming, and often resulted in extremely lengthy delays in the development of much-needed equipment.

It has now been discovered that a method for testing certain undersea operating means, which are intended to operate at, or slightly below, the surface of the silt, or mud-covered, sea floor, can be obtained by simulating the properties of the consolidated sea bed material in a relatively short period, and under a relatively shallow depth of water, by a modified electrophoresis, or electro-osmosis, procedure. The object of this invention is to permit the testing of equipment, e.g., for raking or digging on the sea bed, which can be carried out in an efficient manner, both as to time and cost, while obtaining a reasonable approximation of actual operating conditions. It is a further object of this invention to provide means for testing apparatus for the mining of ocean floor nodule ores from the silt, or mud, covered ocean floor in which they are often located, particularly from the floor characterized as pelagic clays.

In accordance with this invention, there is provided a method of testing the effectiveness of certain undersea operating means intended for use on, or immediately beneath, the sea floor. The ocean floor is formed of a consolidated soil material, the minerological composition varying with geographical area but generally having a relatively high clay content. Generally, the shear strength of the ocean floor soil material increases relatively rapidly downwardly through the upper several inches. The adhesiveness of the soil material varies in different geographical areas, but it is generally relatively adherent, or "sticky." The method of this invention comprises the simulation of the shear strength and adhesive properties of a consolidated ocean floor material from a geographical area of interest.

The method of the present invention comprises:

1. initially forming a consolidated bed of a soil material, by an electroconsolidation procedure which comprises impressing a voltage vertically through an unconsolidated layer of the soil material under water, wherein current flow through the soil-water layer is vertically upward from a positive to a negative electrode, the current flow through the soil and water mixture being maintained until a discrete layer of the soil, having a desired degree of consolidation, is formed as determined by the shear strength profile, with a layer of water maintained thereabove. This electrophoretically consolidated layer of soil forms an underwater test bed, substantially simulating the mechanical and/or rheological properties which are desired; and 2. testing an undersea operating means in operative contact with the consolidated layer of particulate soil material, which thus simulates sea bed surface conditions with respect to the material forming the sea floor.

The apparatus means provided, in accordance with this invention, comprises tank means containing a consolidatable soil material and water; an anode electrode located operatively adjacent the bottom of the tank means; a cathode electrode in facing relationship to, but spaced vertically above, the anode, and within the water level in the tank; electrical voltage and current source means in conducting relationship with the electrodes designed to provide a sufficient voltage drop and current flow between the two electrodes to consolidate the soil material to the desired degree; and apparatus test holding means, operatively connected to the tank for supporting and moving undersea operating means in operating contact with the layer of consolidated soil material within the tank.

Preferably, this process begins with, and the apparatus for carrying out the process contains, a discrete, but at least partially unconsolidated, layer of a particulate clay-containing soil material, covered by a layer of water, which can be clear, but more generally would contain a significant quantity of dispersed particulate soil material. The height of water above the soil layer is substantially immaterial, as long as it is at least high enough to cover the upper electrode. The layer of soil material can be completely unconsolidated, or only the upper portion thereof can be unconsolidated, while a lower portion at, or near, the bottom of the tank, for example, could be consolidated. Preferably, the soil layer initially has a substantially level shear strength profile, i.e., substantially uniform shear strength through its entire depth. In carrying out a series of test procedures, in accordance with this invention, it is expected that usually a lower portion, at least, of the soil layer will not be disturbed during a particular test; accordingly, the soil layer is preferably deconsolidated before the consolidation, as by impressing a reverse voltage and current flow between the electrodes, i.e., the upper electrode becomes the anode and the lower electrode, the cathode.

The presence of dispersed soil particles in the water layer above the soil layer does not interfere with the effectiveness of this invention. However, if it is desired, it is possible to clear the water by causing a precipitation of the dispersed soil material by initially placing the cathode at, or near, the top of the water layer, while maintaining at least the bottom sections of the cathode submerged. The current is then turned on, and the portion of the water layer, at least immediately adjacent the cathode, is clarified. Depending upon the depth of the water layer, the cathode can be gradually moved downwardly towards the top of the soil layer, while maintaining the current and voltage, so as to clarify the entire height of the water layer. When the cathode is adjacent the soil layer, the final consolidation is obtained.

In order to decrease the time for consolidation, the greatest possible current flow is maintained between the anode and the cathode. It has been found that the time required to achieve a desired consolidation decreases almost exponentially as current flow is increased. The maximum current flow is limited only by the electrolytic effect of the current, which results in the formation of electrolytically derived oxygen and hydrogen from the water. When the evolution of oxygen becomes too great, large bubbles are formed at the anode, or lower electrode, during consolidation, which, unless special precautions are taken, pass upwardly through the soil layer disrupting the desired consolidation. Accordingly, the current flow is maintained at a value just below the value at which undesirable disruptive oxygen bubbling occurs. The formation of hydrogen at the cathode can, of course, be a problem when the operation is carried out in a confined area, due to the explosive nature of the gas. However, in open areas, the evolution of these gases is insufficient to present any substantial hazard. Accordingly, it has been found, that unless special precautions are taken to provide alternative venting means for electrolytic oxygen, to prevent its passing upwardly through the clay layer, a current density of not greater than about 1.8 amps per square foot is impressed between the electrodes. The current density between the anode and cathode plate electrodes is preferably maintained substantially uniform along their entire surfaces. This results is a substantially uniform consolidation along the entire bed of soil material. The current density is preferably not greater than about 1.7 amps/sq. ft., and at least about 1 amp/sq. ft., and most preferably in the range of from about 1¼ to about 1½ amps/sq. ft.

It has been found that the optimum voltage drop between the electrodes required to obtain the desired uniform constant current differs somewhat depending upon the clay material utilized, and also, during consolidation, with changing water content, generally decreasing as the clay is consolidated.

The material which forms on the sea floor bottom, especially those areas classified geologically as pelagic clays, has become consolidated over eons of time to varying degrees, as measured principally by its shear strength. The shear strength at the surface and shear strength profile of the ocean bed vary, depending upon geographic location; but such values have been, and can be, readily determined by conventional means, such as for example, by in situ vane tests, or by means of, unconfined compression tests. These, and other mechanical properties of the ocean bed, including especially adhesiveness, are important, for example, in the "mining" of ocean floor nodule ores. The nodule ores are often found embedded within the top layer of the silty clay floor of the ocean, and the properties of the consolidated clay, especially its ability to hold onto the nodule ore particles and to adhere to structural and mechanical devices, greatly affect the efficient extraction of the nodule ore during mining.

These mechanical properties of the ocean bed floor, i.e., shear strength, shear strength gradient with depth beneath the surface, and adhesiveness, can be duplicated by this process of electrolytic consolidation in accordance with this invention by treating a layer of clay material under water. The unconsolidated clay material can, of course, be the actual ocean floor material, dredged up from whatever area is to be simulated. This, however, has been found to be unnecessary: Selected terrestrial clays, or blends thereof, have been found to be useful for satisfactorily duplicating the mechanical properties of naturally consolidated, e.g., undersea pelagic, clays.

Typical pelagic clays, or sediments, for example, taken from ocean floor test borings, have generally been found to comprise from about 50% to about 65% by weight (dry weight) of clay size material, i.e., a particle size of less than 0.002 mm. The remaining portion of dry solids present are almost all silt size material, i.e., particle sizes of from about 0.002 mm. to about 0.064 mm. Only very small percentages of larger sandy particles are present. Variably, from about 80% to about 90% of the dry weight of the pelagic clays consist of the so-called minerals such as illite, Kaolinite, montmorillonites. Such clay mineral analyses of the pelagic clays have been made by previously standardized procedures, so that the mineral analysis as well as the mechanical property analysis of any part of the ocean floor can be obtained, if desired, by presently known and, indeed, conventional means.

As indicated, although the ocean floor material itself can be used as the test material, it has been found that the desired mechanical properties can be duplicated using terrestrial clays with the electrolytic consolidation procedure of this invention. Preferred such terrestrial clays have a clay content of at least about 20% by weight (dry) and most preferably at least about 25% by weight (dry), and optimally at least about 30% by weight (dry), and fine sand not more than about 15% by weight (dry) and optimally less than about 10%, with the remaining constituents being silt.

It is generally necessary to carry out some prior testing in order to determine whether a particular clay can be consolidated and the length of time the electrolysis must be continued in order to achieve the desired mechanical properties. These tests can, however, be carried out on bench-scale equipment, such as in a large beaker, but wherein the depth of the clay layer is maintained at the desired value. It should be pointed out that it is not necessary to search out a clay having the same mineral analysis as the ocean floor material.

It has been found that as the depth of the electroconsolidated test bed increases, the shear strength gradient obtained by electroconsolidation tends to become progressively steeper than that of naturally consolidated sea bed material, so that at the same depths below the consolidated surface, the electro-consolidated material would have a greater shear strength. This is especially significant when the relevant test portion of the clay bed extends more than about two inches below the consolidated surface. This problem can be avoided, however, in accordance with one preferred aspect of this invention, by passing water upwardly, at a uniform rate, through the clay layer during electro-consolidation. The water should be fed at a uniform rate along the entire test bed. The passage of water upwardly through the bed in this manner counters the tendency towards excessively high shear strengths at greater clay depths and results in a test bed which simulates sea bed conditions over almost its entire depth, especially with regard to shear strength gradient.

It is further preferable to begin the electroconsolidation procedure of this invention with a uniformly unconsolidated, or partially consolidated, clay layer. Uniformity of the initial clay layer is generally lacking when a series of tests are carried out. It is usual that the upper portion of the clay layer is disturbed, and thus unconsolidated, to a greater extent than the lower portion of the clay bed. The clay layer can thus be uniformly softened by impressing a reverse current flow between the two electrodes, i.e., making the upper electrode the anode, such that the current flow is downwardly through the clay until the clay is rendered homogeneous along its depth to a uniform low shear strength or even to a viscous liquid condition.

An example of large-scale equipment which can be utilized for carrying out the method, in accordance with this invention, is shown in the accompanying drawings. The equipment shown therein is merely exemplary of that which can be utilized in accordance with the present invention and is not intended to limit the scope thereof. The drawings and the following working examples are merely intended to clarify and exemplify the present invention without being exclusive thereof.

Referring to the drawings:

FIG. 3 is a perspective view showing the upper electrode in a folded position;

FIG. 4 is a cross-sectional elevation view along lines 4 — 4 in FIG. 3; and

Figure 1:
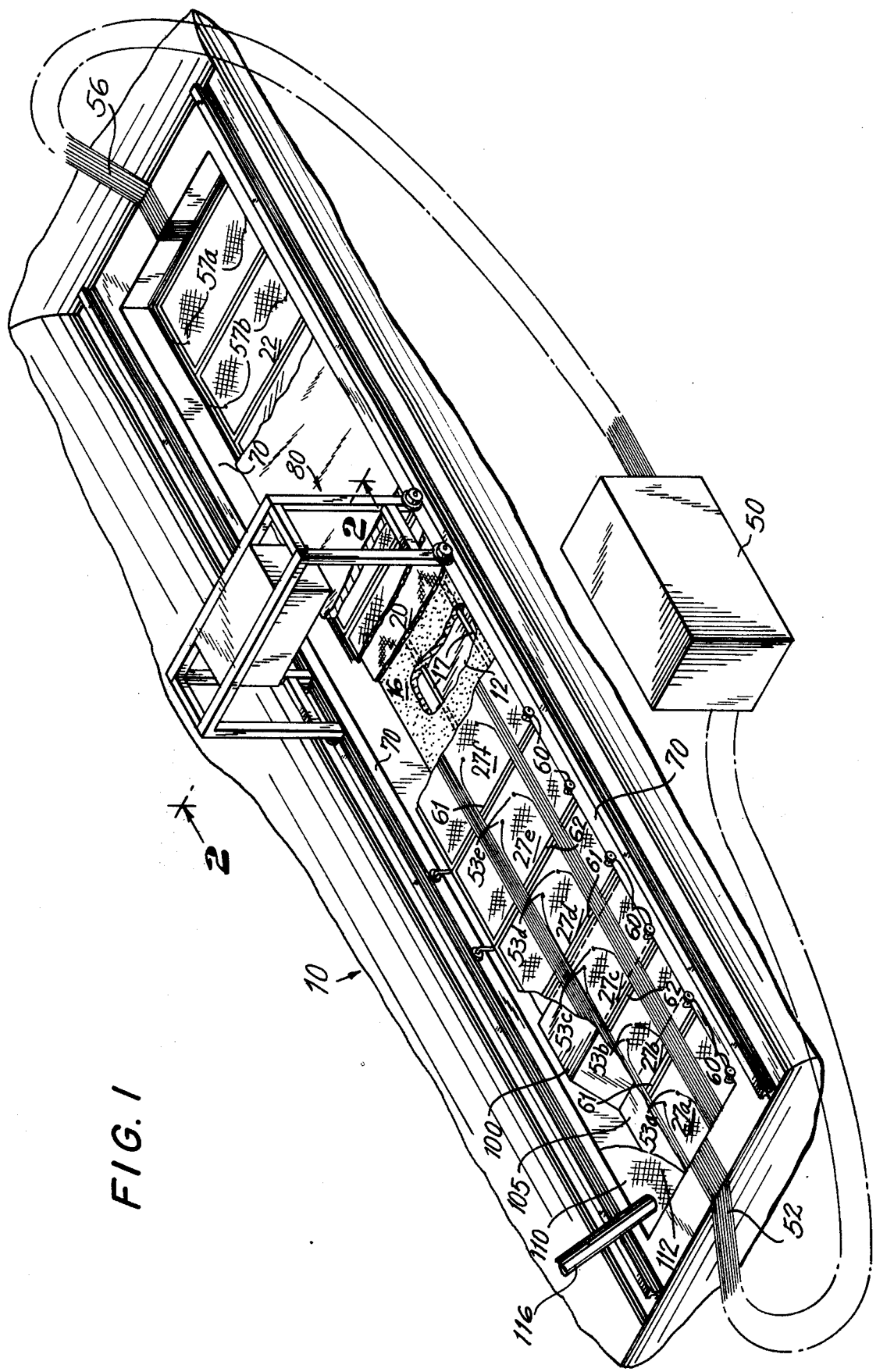
FIG. 1 is a perspective, partially cut away, view of an in-ground pool, or tank, for carrying out the method, in accordance with this invention.
Figure 2:
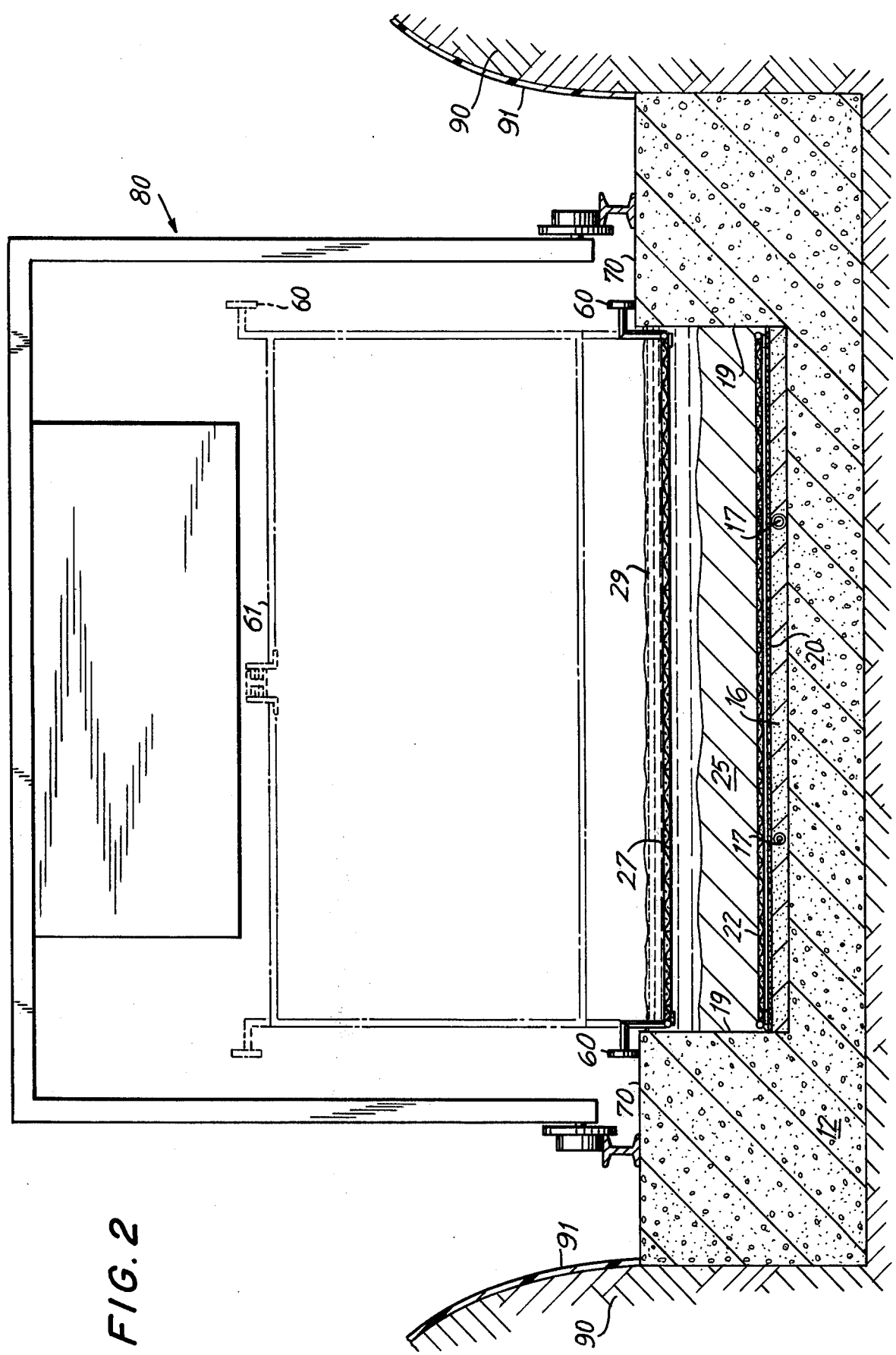
FIG. 2 is a cross-sectional elevation view along lines 2 — 2 in FIG. 1.

Referring to FIGS. 1 to 3, an in-ground tank, generally indicated by the numeral 10 in FIG. 1, comprises a lower basin portion 12 defined by a low electrically conductive, high dielectric, material, such as concrete. It is important that the lower basin be insulated from the ground. Immediately above the concrete base 12, is a porous layer, e.g., of coarse sand and gravel 16, or other water-insoluble material, surrounding two perforated pipes 17, extending longitudinally of the tank and connected to a source of water under pressure, not shown; each perforated pipe 17 is located approximately one-third of the width of the tank in from the nearest side 19. Resting upon, and immediately above, the layer of sand and gravel 16 is a water-permeable membrane 20, formed, for example, of fine mesh fiberglass cloth, which separates the sand and gravel layer 16 from a clay-water layer 25. A steel electrode 22 rests on the water-permeable membrane 20. The steel electrode 22 is formed of an open-mesh material, such as so-called "expanded metal." The electrode 22 extends substantially the entire width of the basin 12 so as to provide electrical current capability across the entire width of the basin.

As shown in the cross-sectional view of FIG. 2, the clay-water layer 25 extends upwardly from the membrane 20 and indeed, extends through the open-mesh of electrode 22. The water-permeable membrane 20 is designed to be impermeable to the particles forming the clay layer 25. In the preferred embodiment shown in the drawings, a segmented upper electrode 27 is suspended in a water layer 29 extending above the clay layer 25. Preferably, the upper electrode 27 is separated from the clay layer 25, at least after consolidation, by a layer of water. The height of water above the electrode 27 is not relevant to the operation of the system. The upper electrode 27 is also of an open-mesh material, such as the expanded metal material used to form the lower electrode 22. The open mesh nature of the two electrodes permits the settling of the clay, or soil, particles through the electrodes, and the passage of any gas evolved during electrolysis upwardly therethrough, and also eases the movement of the upper electrode 27 through the water during its retraction or extension by folding.

In order to suitably work in the test bed formed by the consolidation of the clay layer 25, the upper electrode 27, which also extends the entire width and length of the basin 12, is preferably formed of independent sections which can be readily moved so as not to obstruct any testing to be carried out on the consolidated clay bed 25. As shown in FIG. 1, the upper electrode 27 is formed of hinged sections 27a, 27b, 27c, etc. As shown in FIG. 3, the preferred method for removing the upper electrode is to have the individual sections hinged and the entire electrode being capable of being folded together up against one end of the tank 10. Electrical conducting cables 52 are in electrical connection with a source of direct current 50 and with each section of the upper electrode 27, via electrical connecting terminals 53a, 53b, 53c, etc. in the respective sections. The upper electrode connecting terminals 53 are located substantially adjacent the longitudinal axis of the upper electrode 27. The lower electrode 22 is connected to the opposite terminal of the source 50 via cables 56. Cables 56 are connected to the lower electrode 22, beginning with the second end of the pool, as shown in FIG. 1. The plurality of cables 56 are connected to the lower electrode 22 at a plurality of cable terminal points 57a, 57b, etc. which are located adjacent the two sides of the lower electrode 22. The terminal points 57 are evenly spaced along both sides of the lower electrode 22, and are spaced apart by approximately the same distance as the terminals 53 in the upper electrode 27. The placement of the terminals 53 and 57 in this manner is one method of obtaining a more nearly uniform current flow between the electrodes 22, 27, when the electric current is activated.

As stated above, the upper electrode 27 is formed of hinged sections 27a, 27b, etc. The two corners at one end of each section are supported from rollers 60, designed to roll along the upper surface 70 of the edge of the concrete basin 12. The hinged joints 61 and 62 between adjacent sections, fold in opposite directions, as shown in FIG. 3. Downwardly folding hinges 61 are placed at the alternate joints that move above the level of the tank when in the retracted position and are each connected by cables to two winches 59, 63, supported on a frame, not shown, at the first end of the tank 10. Each of the cables 64, 65 extending from the winches 59, 63 respectively, is slidably connected to a pulley or sheave, 68, connected above each of the downwardly folding hinges 61, and is secured to the end of the last electrode section 27 $\Omega$ at the point indicated by the numeral 71. A second pair of cables 72, 73 are secured at points 70 to the last section 27 $\Omega$ and to a second pair of winches 74, 75 respectively, supported on a frame, not shown, above the second end of the tank 10. Holding means 100 are provided at the center of each joint 61 and are designed to connect the fully folded upper electrode 27 at an overhead support, such as I-beam 101, at the first end of tank 10.

At traveling test framework, indicated by the numeral 80, rides on tracks along the upper side surfaces 70 of the concrete basin 12 and is designed to support operating means to be tested and to move said operating means by motor means not shown, along the length of the tank, at substantially any level above the lower electrode 22. If the height of the water level extends above the sides of the concrete basin 12, the water is contained within earthen berms 90, covered with impermeable plastic sheets 81, which define the upper sides of the tank 10.

A low weir 100, at the first end of the basin 12, separates the test bed portion from a settling section 105. A wedge-shaped catch basin 110, in one corner of the settling section is covered with a mesh 112 to aid in preventing clay particles from leaving the tank 10. A water conduit pipe 116 connects the catch basin 110 with a reservoir not shown.

In operation, the tank, with the upper electrode in its retracted position, as shown in FIG. 3, is filled to a desired level initially with a thick viscous slurry of a desired clay material, immediately above the lower electrode 22. Additional water is then passed into the tank via conduit 116 and the catch basin 110 and settling section 105, and over the weir 100, until the water is several inches above the clay layer 25 in the tank. The second pair of winches 74, 75 are then activated so as to draw in cables 72 and 73, attached at point 71 to the free end of the upper electrode 27, drawing the electrode 27 out along the length of the basin 12, until the basin 12 is substantially covered thereby. Water is next passed through the lower perforated pipes 17, so as to flood the sand and gravel layer 16, causing water to flow upwardly through the membrane 20 and thus upwardly through the clay layer 25. The electrical source 50 is then activated so as to polarize the electrodes, forming a cathode of the upper electrode and an anode of the lower electrode. Current flow is thus nominally downwardly, from the cathode or upper electrode 27 to the anode or lower electrode 22. The voltage drop between the anode and the cathode is maintained sufficient to obtain a desired uniform current flow between the two electrodes, through the water and clay material, so as to permit the electrophoretic consolidation of the clay at the greatest possible rate, but without any significant electrolysis of the water. The simultaneous upward flow of water from the sand and gravel section through the membrane and then into and upwardly through the clay layer 25, prevents an excessive consolidation of the clay layer immediately adjacent the lower electrode, or anode, 22.

Although there are different theoretical explanations of the fundamental nature of the electroosmosis phenomenon, it is known that the application of a DC voltage between electrodes embedded in wet clay soil results in the flow of water away from the anode, towards the cathode, and the corresponding dewatering, and thus increased shear strength, of the clay soil material. Generally, the degree of consolidation, and thus the shear strength and shear strength gradient of the clay layer 25, is a function of the magnitude of the electrical current passing between the electrodes 22 and 27 (i.e., amperes per square foot), the period of application of the current, the condition with respect to consolidation, specifically the water content of the clay soil, at the beginning of the consolidation cycle, and the rate of water flow upwardly through the clay from beneath the membrane 20. It must be pointed out, however, that the flow of water upwardly is merely a preferred embodiment, and it need not be carried out, especially when shallow clay layer depths are utilized. Preferably, not more than about 0.6 gallon per square foot per hour, of water is passed upwardly from beneath the water-permeable membrane 20, most preferably not more than about 0.5 gallon per square foot, and optimally from about 0.1 to about 0.5 gallon per square foot.

When the clay layer 25 has reached a desired degree of consolidation, the water flow through perforated pipe 17 is shut off and the current flow is broken between the electrodes. The winches 59 and 63 at the first end of the tank are activated to draw in lines 64 and 65, respectively, thus drawing in and folding the upper electrodes 27 against the first end of the tank, as shown in FIG. 3. When the surface of the tank is fully exposed, the surface can then be additionally treated to make the desired test; for example, ocean floor nodule ores, or replicas thereof, can be randomly dispersed along the surface of the consolidated layer. Additional water can then be added to increase the depth of the water above the consolidated clay, without disturbing the consolidated clay layer, by passing additional water through conduit 116 to fill the tank 10 to whatever depth is desired. The additional depth of water will have substantially no effect upon the consolidated clay layer 25. Alternatively, the water level can be at the desired higher level before consolidation begins, or water can be added above the upper electrode 27 during consolidation.

The undersea operating means to be tested is suspended from the overhead structure 80 down to the level of the clay, and the overhead structure is then rolled along the length of the tank, permitting the operating means to be dragged along the surface of the clay layer 25. For example, dredge means for collecting manganese nodule ores from the surface of the sea can be tested in this manner.

The above described equipment, as shown in the accompanying drawings, was utilized in carrying out a series of tests, initially to determine its effectiveness in simulating sea bed floor conditions, and subsequently, for testing the effectiveness and efficiency of apparatus for use in mining the ocean floor bottom.

EXAMPLE 1

The tank 10, as generally shown in FIG. 1, has the dimensions of 15 × 250 feet, and contains a mixture of water and clay-containing soil, to a total depth of about 18 inches above the lower electrode 22. Sufficient clay is added to form a consolidated bed about 8 inches in depth. The two electrodes 22, 27 are separated by 10 inches, vertically.

A terrestrial silty clay soil known as sedimentary clay and quarried in the James River area of Virginia, was utilized. The soil contained a clay size material (under 0.002 mm. diameter particles) content of about 33% dry weight, a silt size material (between about 0.002 and 0.064 mm. diameter) of about 57% dry weight, and sandy material (greater than 0.064 mm. diameter) of less than about 10% dry weight. The mineralogical analysis of the clay size fraction was as follows:
quartz - 55%
Kaolinite - 30%
Illite - 10%
Chlorite - 5%
Montmorillonite - Trace The test of the present example is to electro-consolidate the terrestrial clay soil in the tank to achieve substantially the same shear strength gradient profile as a plageic clay ocean floor layer to be simulated.

The water and soil were initially placed in the tank, such that the soil was in, what is known as a "fully unconsolidated condition." A voltage drop of about 135 volts was initially impressed between the anode 22 and the cathode 27, so as to obtain a substantially uniform current density between the two electrodes of about 1.5 amps. Simultaneously, a flow of water was instituted through the perforated pipes 17 so as to obtain a water flow of 0.4 gal./sq. ft. upwardly through the clay.

The ambient temperature, was approximately 20° C, and the temperature of the water - clay soil mixture was approximately 20° C. After a period of about 2 hours, the voltage drop had decreased to about 95 volts, with constant current flow; the current flow and upward water flow were discontinued and upon testing, the consolidated soil layer was found to substantially simulate the shear strength gradient profile of the consolidated seabed, as determined from a testing of core samples.

The shear strength tests were carried out, using a conventional vane shear test, as described for example in PROCEDURE FOR TESTING SOILS, ASTM, 4th Edition, and ASTM D:2573-72, FIELD VANE SHEAR STRENGTH IN COHESIVE SOIL, except that a smaller test vane of 1 inch diameter by 1 inch vertical dimension, was used in order to more accurately measure the shear strength profile of the upper few inches.

Normally, as set forth in the referenced procedures, vanes of 2 inches diameter by 4 inches in height, or larger, are used for in situ field measurements in soft soils. Vanes of such size would not permit measuring shear strength at small intervals of depth within the upper few inches. Although a motor driven vane shear device with a recording strip chart can be used, it has been found adequate to rotate the vane by means of a small precision torque wrench as is covered by Subsection 3.4 of the second reference.

Rotational torques were read and recorded with the upper edge of the one-inch by one-inch vane flush with the surface of the soil, and torque measurements were similarly made with the center of the vane at depths below the surface of the soil of 2 inches, 4 inches and 6 inches. Such series of readings was taken at approximately 12 different locations distributed over the length of the tank, in order to check upon the uniformity of consolidation and to provide a statistical average measurement of shear strength versus depth.

A graph of shear strength versus depth of the soil in test tank was superimposed upon a similar plot for the seafloor of interest in order to provide a readily comprehensible comparison of the two.

It has further been found that the adhesiveness of the electroconsolidated clay soil is substantially the same as the naturally consolidated ocean floor clay surfaces.

After the clay soil layer had been consolidated, simulated ocean floor nodule ore pellets, having the same size, shape and density of the actual nodule ore, but a greater resistance to breakage so as to enable them to be reused, where randomly spread on the surface of the consolidated soil layer. Additional water was thus added to the tank to increase the total depth of water to about 9 feet. A nodule harvester was suspended from the traveling test structure and passed through the water along the length of the bed.

The extra water was then withdrawn from the tank 10 to decrease the water depth so that the top of the clay bed is visible. The number and amount of nodules gathered by the nodule harvester were measured at the end of the test, following a single pass therethrough, in order to determine the harvesting efficiency of this device.

Following completion of the test, the test bed was prepared for a second test. The current flow was reversed between the electrodes, such that the upper electrode 27 becomes an anode. A voltage drop of about 105 volts was initially impressed between the electrodes to maintain the constant uniform current flow of about 1.5 amps. The current was maintained until the required voltage had increased to about 145 volts and the clay was in a near viscous condition, having a substantially uniform, very low shear strength throughout (both horizontally and in cross-section). The electro-consolidation of the clay soil then proceeded as described above.

The drawings and the Examples set forth above are intended to describe preferred examples of the present invention. They are not to be taken as exclusive of the scope thereof. Other materials and apparatus, now available or developed in the future, which are the equivalents of those disclosed herein, can be utilized within the scope of this invention.

The embodiments of this invention, which are claimed, are as follows:

1. A method of testing the effectiveness of undersea operating means intended for use on, or beneath, a sea bottom surface formed of consolidated,
   soil material, the method comprising:
   a. consolidating a bed of particulate soil material by a consolidation procedure comprising:
   i. impressing a voltage drop vertically downwardly across a relatively unconsolidated layer of the soil material in water, wherein current flow through the water is between an upper, relatively negatively charged, electrode and a lower, relatively positively, charged electrode provided beneath the soil layer to be consolidated; and
   ii. maintaining the voltage drop and current flow between the positive and negative electrodes through the water and soil layer until a layer of the soil having a desired degree of consolidation, as determined by its shear strength, is formed beneath a layer of water, whereby an underwater test bed is formed substantially simulating the mechanical properties which are desired; and
   b. testing undersea operating means in operative contact with the consolidated layer of soil material, whereby undersea floor surface conditions are simulated with respect to the consolidated sea floor material.

2. The method of claim 1, wherein the soil layer is consolidated so as to simulate the mechanical properties of the consolidated soil layer of the deep ocean floor to a depth of at least about 1 inch.

3. The method of claim 2 wherein, the current density is substantially uniformly maintained at a value of at least about 1 amp/sq. ft. along the entire soil layer.

4. The method of claim 3, wherein the current density is maintained at a value of at least about 1.25 amps/sq. ft.

5. The method of claim 2, wherein the testing comprises initially distributing nodules along the surface of the consolidated soil layer.

6. The method of claim 5, wherein the consolidation is carried out under a relatively shallow depth of water and further comprises adding additional water subsequent to distributing the nodules, so as to increase the depth of water covering the nodules.

7. The method of claim 6, wherein the operating means is a dredge means designed to remove nodule ore from the ocean floor and wherein the testing comprises dredging the consolidated surface to remove the distributed nodules after the addition of the additional water.

8. The method of claim 1, wherein the soil layer comprises at least about 20 percent by weight clay.

9. The method of claim 8, wherein the soil layer comprises not more than about 95 percent clay.

10. The method of claim 1, wherein the portion of the soil layer immediately adjacent the lower electrode is initially consolidated and comprising in addition preliminarily impressing a reverse voltage drop between the two electrodes, whereby the lower electrode is relatively negatively charged and the upper electrode is relatively more positive, whereby the soil layer is rendered more homogeneous with respect to the degree of consolidation.

11. The method of claim 1, comprising in addition flowing water upwardly through the soil layer while passing current therethrough.

12. Apparatus for determining the effectiveness of undersea operating means intended for use on, or beneath, a sea bottom surface formed of consolidated soil material, the apparatus comprising:
a. liquid-retaining tank means;
b. lower electrode means within the lower portion of the tank means having a surface extending longitudinally thereof;
c. upper electrode means within the tank means, having a surface in facing relationship to and vertically above the lower electrode means;
d. liquid flow means for flowing liquid into and out of the tank means;
e. a mixture of water and electro-consolidatable soil material within the tank means and in contact with the facing surfaces of both electrodes;
f. holding means for removably holding undersea operating means in contact with the surface of the soil material;

the electrodes being designed to be energized by a source of direct current such that the lower electrode is relatively positively charged whereby the soil material is consolidated into a discrete layer beneath water and undersea operating means can be tested in contact with the consolidated soil layer wherein the undersea floor is simulated.

13. The apparatus of claim 12, comprising, in addition, a source of direct electric current and means for reversing the flow of current from the source of the electrodes.

14. The apparatus of claim 12, comprising, in addition, a porous member located within the tank beneath, and capable of suppoting, the consolidated soil layer, the porous member being substantially permeable to water but substantially impermeable to the soil particles, and liquid flow means located beneath the porous member, whereby water can be fed into the tank by being passed upwardly through the porous membrane and the soil layer.

15. The apparatus of claim 12, wherein the holding means comprises track means, structural support means disposed to move along and be guided by the track means and extending above the level of water and soil in the tank, and means for holding undersea dredging means within the tank and in operative contact with the consolidated soil layer.

16. The apparatus of claim 12, wherein the upper electrode means comprises moving means for moving the electrode out of position above the consolidated soil layer.

17. The apparatus of claim 16, wherein the moving means comprises means for retracting the upper electrode into a compact shape to a position adjacent one edge of the tank.

* * * * *